Figure 1:
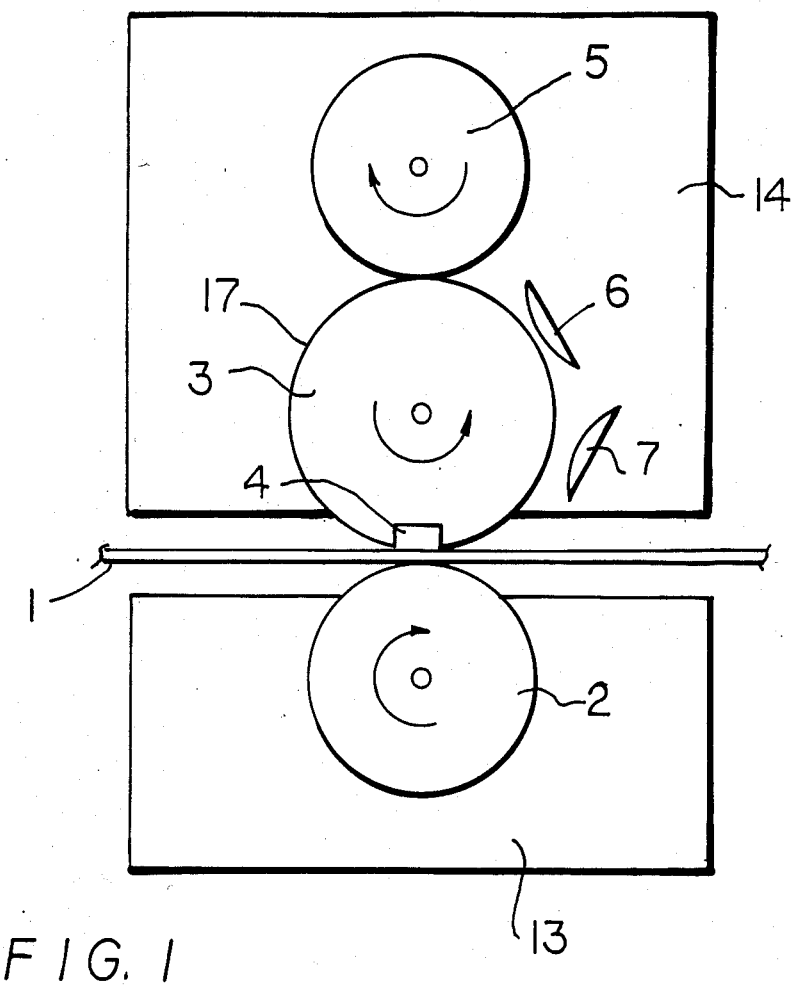

United States Patent [19]

Puumalainen

[11] Patent Number: 4,700,486

[45] Date of Patent: Oct. 20, 1987

[54] MEASURING THE THICKNESS FOR A CONTINUOUS MATERIAL WEB

[75] Inventor: Pertti Puumalainen, Kuopio, Finland

[73] Assignee: Puumalaisen Tutkimuslaitos Oy, Kuopio, Finland

[21] Appl. No.: 867,687

[22] Filed: May 28, 1986

[30] Foreign Application Priority Data

May 28, 1985 [FI] Finland .................................. 852127

[51] Int. Cl.[4] .......................... G01B 7/04; G01B 7/10
[52] U.S. Cl. ................................ 33/147 L; 33/143 L; 324/231
[58] Field of Search ............. 33/143 L, 147 L, 147 N; 73/159; 324/229, 231

[56] References Cited

U.S. PATENT DOCUMENTS

| 2,676,298 | 4/1954 | Frommer .......................... 33/147 L |
| 3,462,680 | 8/1969 | Kahoun et al. ...................... 324/231 |
| 3,676,933 | 7/1972 | Slone ................................. 33/147 L |
| 4,136,454 | 1/1979 | Jenkins et al. .................... 33/147 L |
| 4,271,699 | 6/1981 | Williamson ....................... 33/147 L |
| 4,291,577 | 9/1981 | Baum et al. ........................... 73/159 |

OTHER PUBLICATIONS

Poon, "Magnetic Reluctance Transducer", *Journal of Physics E,* 7–1970, pp. 507–510.

*Primary Examiner*—Richard R. Stearns
*Attorney, Agent, or Firm*—Cushman, Darby & Cushman

[57] ABSTRACT

An arrangement for measuring the thickness of a continuous material web. The thickness of the material web is measured by pressing from opposite sides of the web, and on the same spot, wheels which can rotate against the web. One wheel is equipped with a conductive surface, and the other wheel has a detecting element which measures the distance from the conductive surface.

10 Claims, 2 Drawing Figures

MEASURING THE THICKNESS FOR A CONTINUOUS MATERIAL WEB

The object of the invention is a method for measuring of the thickness of a continuous material web and a device for the realization of the method.

In the production of a continuous material web the thickness of the material web must be continuously monitored. Especially in the paper industry, the thickness of the paper and the corresponding products as well as the thickness profile in the cross-direction are measured during the manufacturing process.

The thickness of the paper products is measured nowadays at the production stage nearly always on the basis of induction by placing on one side of the web a coil, and on the opposite side of the web a coil core and the change in inductance is measured. The measurements are performed either by dragging these parts on the opposite sides against the paper web and by pressing them directly against the paper web, or by forming a controlled air cushion in the interspaces between the probes and the paper web.

Both of the methods have disadvantages. By closing the probes against the material web they get scratches and are contaminated by impurities, such as resin materials, and might damage the material web. When measuring by using the air cushion the interstice to be measured is increased and accuracy is decreased. Additionally, the thickness of the air cushion might change when the bite of the paper surface is changing.

The purpose of the invention is to bring forth a method for measuring the thickness in a continuous material web, while eliminating the associated disadvantages with. In addition, the purpose of the invention is to bring forward a method for measuring the thickness of the material web continuously and in a dependable way, and the possible impurities are observed quickly, and which enables continuous calibration. Further, the aim of the invention is to devise a device for applying the method, which is accurate and dependable.

The aim aim of the invention is achieved by the method and the device, which are presented in the claims.

According to the invention, the thickness of the material web is measured by pressing against the material web from opposite sides at the same spot wheels which are rotatable against the material web. One wheel is equipped with a conductive surface and by means of a detecting element placed on the other wheel the distance from the conductive surface is measured, whereas with the help of calibration, the thickness of the material web can be determined from the minimum reading of the detecting element.

Figure 2:
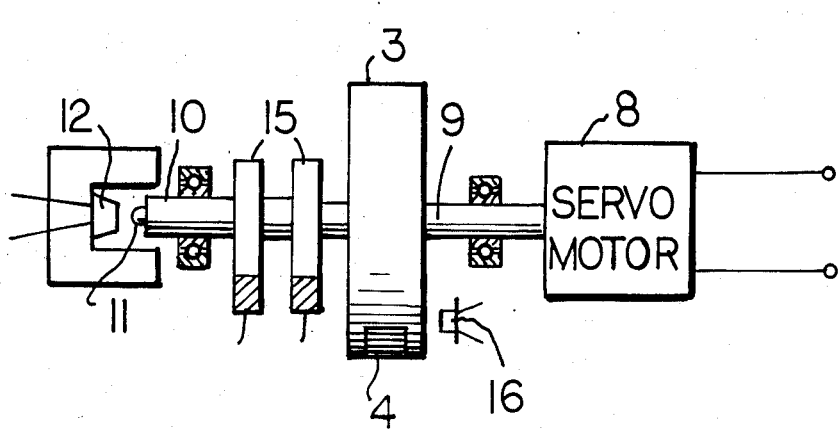

In the following invention is explained by referring to the attached drawings, in which FIG. 1 illustrates one application of the device for applying the method in accordance with the method as seen in the cross-direction of the material web, and FIG. 2 illustrates one application of the detecting element part as seen from the side.

In the device in accordance with FIGS. 1 and 2 on opposite sides of the material web 1 are placed a conductive surface equipped response wheel 2 and the detector wheel 3. In this application in casing 13 is placed response wheel 2 made of metal, and in detector casing 14 is placed detector wheel 3 made of insulating material, into which detecting element 4 is placed. Additionally, against the detector wheel are placed calibration wheel 5, which is rotatable together with the detector wheel, and at a distance from the detector wheel are placed calibration segments 6, 7.

According to the FIG. 2, inside the detector wheel is an oscillatory circuit and a regulating and a filtration apparatus for untreated electricity. The untreated electricity is brought to the wheel by means of sliding rings and carbons 15. To the device belong a shaft 9, at the one end 10 of which is placed a transmitter apparatus 11 in order to transfer optically the information regarding the frequency of the oscillatory circuit to the photodiode 12 from where it is forwarded for further processing. Additionally, a servomotor 8 is provided for rotating the wheels to the wished peripherical velocity as well as an optical reading device 16 for determining the position of the wheel.

In measuring the thickness of the material web are pressed on both sides, with a certain force, rotating wheels 2, 3. When the material web is moved and the wheels are rotating, the frequency of the oscillatory circuit built into the detector wheel is changed when it comes at the spot against the response wheel. The position of the detector wheel is read optically at 16 with the help of the radial lines produced on its surface. When the detector wheel is rotating and the detecting element is approaching the material web, the optical meter obeserves this and the pulse counting is started. The counting is done for a certain time, during which the detecting element passes the contact spot of the material web. After this for the same period of time the pulses are measured in a corresponding way when the detecting element passes the metallic calibration wheel. An amount of pulses comparable with the thickness is obtained when the difference in the pulse amounts is divided by the amount of pulses obtained against the calibration wheel. In this way a measuring result is obtained, which is not dependent on the slow movement of the oscillatory circuit and which is not dependent on the speed of the track.

In FIG. 1 automatic calibration is presented, where the metallic calibration segments are placed at a certain distance from the detector wheel. When these segments are used, as well as the zero value from the calibration wheel and the infinite value from the point 17, an internal back stop calibration is obtained automatically.

The measurement are usually started at the calibration station next to the material web by rotating the wheels with the servomotor to a peripherical velocity which is equal to the track speed of the production machine. The radii of the metal wheels and segments are exactly the same, but the radius of the detector wheel is somewhat different from these. Hereby it is possible to check at the calibration station the possible impurities stuck to the response wheel, which appear as periodically repeating changes in the sequentially measured results. If there are impurities, the response wheel can be cleaned up at the calibration station. When the device is transferred above the web, the trains of wheels are lifted from the web edge sensor signal inside the casings and after that the edge of the web is transgressed the wheels are pressed against the surface of the web and the servomotor can be switched off.

When traversing over the web, for one analysis value (e.g. 10 cm of track width) several tens of measuring values are taken, the mean and dispersion are calculated, and the results exceeding a certain value are rejected. The mean is calculated anew, and is given as the measured result. In such a way, the influence of occasional impurities is eliminated, as well as possible dirt stuck on the response wheel. Both of the casings are pressurized to an excess pressure by a slight continuous flow of compressed air. In the above, the frequency of the oscillatory circuit within the detecting element varies because of the inductive interaction between the oscillatory circuit and the conductive surface, or the inductive interaction between the oscillatory and one of the calibration devices.

The invention is not limited to that just presented, and can vary while still falling within the scope of the claims below.

I claim:

1. A method for determining the thickness of a material web comprising:

pressing from opposite sides of the material web and in the same position in space first and second rotatable wheels, said first wheel having a detecting element on its circumference and said second wheel having a conductive surface on its circumference;

detecting the distance between said detecting element and said conductive surface when said detecting element passes said position and generating therefrom a distance count;

calibrating said detecting element and generating therefrom a calibration count; and generating a thickness measurement, indicative of the thickness of said web, in accordance with said distance count and said calibration count.

2. A method according to claim 1:

wherein said detecting step comprises the step of counting pulses corresponding to the frequency of an oscillatory circuit within said detecting element when said detecting element is passing said position to obtain a distance count, said frequency varying because of the inductive interaction between said oscillatory circuit and said conductive surface;

wherein said calibrating step comprises counting the pulses of said oscillatory circuit when said detecting element passes, at least one of, a calibration wheel and two or more calibration segments to obtain therefrom a calibration count, the frequency of said oscillatory circuit varying because of the inductive interaction between said oscillatory circuit and said calibration wheel, or said oscillatory circuit and said calibration segments; and wherein said thickness determining step comprises calculating the difference between said distance count and said calibration count, and dividing the difference by said calibration count and generating therefrom said thickness measurement.

3. A method according to claim 2:

wherein said thickness determining step comprises accumulating a plurality of thickness measurements and computing the periodic error caused by impurities stuck to the surface of said second wheel and removing said periodic error from said thickness measurement.

4. A method according to claim 2 which further comprising the step of:

investigating the purity of said second wheel, prior to when said first and second wheels are pressed together against said web, by driving said first wheel at the same peripheral velocity as said web by a servomotor, said servomotor and said calibration segments being located on the same side of said first wheel.

5. A method according to claim 1 wherein said calibrating step comprises the steps of:

counting the pulses corresponding to the frequency of an oscillatory circuit within said detecting element when said detecting element passes at least two calibration segments located at different distances from said first wheel to obtain a segment calibration count, counting the pulses when said detecting element passes a calibration wheel to obtain a wheel calibration count, and counting the pulses when said detecting element passes a predetermined location to obtain an infinite value calibration count, and generating said calibration count in accordance with said segment calibration counts, said wheel calibration count and said infinite value count.

6. Method according to claim 1 wherein said distance detecting step comprises the step of:

accumulating several distance counts and where said thickness determining comprises the step of determining thickness in accordance with the lowest distance count accumulated and said calibration count.

7. An apparatus for measuring the thickness for a material web comprising:

first and second rotatable wheels pressed against opposite sides of the web from the same position in space, the first wheel having a detecting element on its circumference and said second wheel having a conductive surface on its circumference;

said detecting element including a oscillatory circuit, said oscillatory circuit producing pulses which correspond to the frequency of its oscillation, said frequency varying because of the inductive interaction between said oscillatory circuit and said conducting surface, wherein said oscillatory circuit produces a distance count in accordance with the distance between said oscillatory circuit and said conductive surface;

a calibration device associated with said first wheel, wherein said oscillatory circuit produces a calibration count in accordance with the distance between said oscillatory circuit and said calibration device; and data processing means for processing said distance count and said calibration count and generating therefrom a thickness measurement.

8. An apparatus in accordance with claim 7 wherein said calibration device includes a calibration wheel placed against said first wheel, and at least one calibration segment placed adjacent to said first wheel, wherein said calibration count is produced in accordance with the inductive interaction between said oscillatory circuit and said calibration wheel, and said oscillatory circuit and at least one calibration segment.

9. An apparatus in accordance with claim 8 wherein said first wheel includes an electrical power regulation apparatus and an electrical power filtration apparatus for treating the electrical power supplied to said oscillatory circuit, wherein electrical power is fed to said oscillatory circuit by a shaft attached to said first wheel, and wherein said shaft includes a transmitter which optically transfers pulses, corresponding to the frequency of said oscillatory circuit, to said data processing means.

10. A method for determining the thickness of a material web comprising:

pressing from opposite sides of the material web and in the same position in space first and second rotatable wheels, said first wheel having a detecting element on its circumference and said second wheel having a conductive surface on its circumference;

generating a distance signal count in response to the distance between said detecting element and said conductive surface;

generating a calibration count in response to the distance between said detecting element and a calibration device; and calculating the thickness of the web in accordance with said distance and calibration counts.

* * * * *